United States Patent Office 3,032,387
Patented May 1, 1962

3,032,387
SELECTIVE REMOVAL OF NITROGEN OXIDES FROM GAS STREAMS
Holger C. Andersen, Morristown, and Johann G. E. Cohn, West Orange, N.J., and Richard C. Glogau, West Chester, Pa., assignors, by mesne assignments, to Engelhard Industries, Inc., Newark, N.J., a corporation of Delaware
No Drawing. Filed Apr. 17, 1959, Ser. No. 807,004
16 Claims. (Cl. 23—2)

This invention relates to the selective removal of nitrogen dioxide and nitric oxide from a gaseous mixture containing oxygen and inert gases and, more specifically, pertains to the reduction of nitrogen dioxide to nitric oxide in the presence of oxygen, using a fuel in an amount less than the oxygen equivalent, at temperatures below those at which nitrogen dioxide dissociates to nitric oxide, followed by selective reduction of nitric oxide with ammonia.

Typical industrial gases which may be treated in accordance with the process of the present invention are the waste or stack gases from nitric acid plants and various nitration processes. Such gases constitute a widespread air pollution problem, and many processes have been developed or proposed for removing the contaminants which are, primarily, nitrogen dioxide and nitric oxide. The dioxide exists in equilibrium with the dimer, $N_2O_4$; it is common practice to refer to the two oxides of tetravalent nitrogen collectively as nitrogen dioxide.

In copending application Serial Number 615,496, filed October 12, 1956, there is disclosed a single stage catalytic process for the purification of waste or tail gases wherein oxides of nitrogen are eliminated while heating values of the waste gases are simultaneously recovered. In this process, the oxygen present in the waste gases is removed by a catalytic combustion reaction, and the oxides of nitrogen are reduced to nitrogen and water. In catalytic processes of this type, it has been found that it is generally necessary to have a fuel present in a stoichiometric excess over the oxygen content of the waste gas and, under such conditions, a very large quantity of heat is generated in the catalyst bed.

The high temperature attained by the catalyst is detrimental in that a loss of catalyst activity results, and the problem becomes of greater magnitude with increasing oxygen concentration in the waste or tail gases.

In copending application Serial Number 650,860, filed April 5, 1957, now Patent No. 2,970,034, one method of overcoming the foregoing deficiency is disclosed in which the removal of oxygen and the catalytic reduction of the oxides of nitrogen in waste or tail gases is effected in two stages in such a manner that only a part of the total heat is generated in each stage. The temperature to which the catalyst is subjected is thus decreased and its life and activity are correspondingly extended.

In copending application Serial Number 694,502, filed November 5, 1957, now Patent No. 2,795,025, a process is disclosed for the selective removal of oxides of nitrogen from waste or tail gases without appreciable consumption of the oxygen present in the gases and, in this process, ammonia is used as the fuel. In this process, the gaseous mixture is passed over a supported platinum group metal-containing catalyst, whereby selective removal of the oxides of nitrogen from oxygen-containing gas is effected.

In copending application Serial Number 803,065, filed March 31, 1959, and now abandoned, there is disclosed a process in which hydrogen or other easily ignitible fuel is added to a gas stream which contains at least nitric oxide and nitrogen dioxide and which may also contain oxygen and inert gases, and passing the mixture over a suitable catalyst, i.e. a platinum group metal-containing catalyst, preferably platinum, ruthenium, palladium or rhodium. In this process, the nitrogen dioxide is selectively reduced to nitric oxide.

With particular reference to the selective process disclosed in application Serial No. 694,502, supra, now Patent No. 2,975,025, it has been found that this process can be improved by the use of hydrogen in conjunction with ammonia. As disclosed in the copending application, ammonia effects removal of both nitric oxide and nitrogen dioxide and, when streams in which the oxide is solely or primarily nitric oxide, ammonia alone operates satisfactorily over extended periods of time. In fact, laboratory catalyst life tests have shown no diminution of oxide removal efficiency after 1900 hours on stream. If, however, the stream contains appreciable nitrogen dioxide, initial removal is good, but the activity decreases after some time on stream. This decrease in activity is accompanied by a bleaching effect of the catalyst, a phenomenon which is not thoroughly understood, but which appears to occur only when ammonia and nitrogen dioxide, in combination, contact the catalyst.

From the foregoing, it is clear that any means which will reduce the nitrogen dioxide concentration in the gas stream will improve the life and operation of the catalyst used in the process employing ammonia. Thus, in accordance with the present invention, hydrogen, or other easily ignitible fuel, is used in conjunction with ammonia to improve the ammonia selective removal process, and the hydrogen may be mixed with the ammonia and passed through a single bed of catalyst, or the hydrogen may be added to the main gas stream which is passed through a first catalyst bed, after which the semi-treated gas is mixed with ammonia and treated catalytically in a second catalyst bed. In addition, the single catalyst bed may be comprised of a number of layers of different catalytic materials, such that the gas to be treated contacts a first catalyst and a second catalyst in the same bed, or the separate catalyst beds may be comprised of the same or different catalysts.

Illustrative of certain of the different ways in which the present invention can be applied to improve the catalytic process employing ammonia, are the following:

A. To the gas to be treated, containing nitric oxide, nitrogen dioxide, oxygen and nitrogen, a small amount of hydrogen is added. The mixture is then passed over a catalyst bed (stage 1) which converts the nitrogen dioxide substantially completely to nitric oxide. Ammonia is added to the first stage effluent, and the mixture of ammonia, nitric oxide, oxygen, water vapor and nitrogen is then passed over a second catalyst bed (stage 2) where the nitric oxide is substantially completely removed.

In order to prevent reoxidation of nitric oxide to nitrogen dioxide between the catalyst stages, the retention time is maintained very short. Preferably, this is accomplished by locating both the catalyst beds in the same vessel with a minimum gas volume between the two and, in turn, this requirement calls for operating the first stage at a temperature such that the first stage effluent gas has a temperature near the optimum required for the ammonia selective process. This requirement can be readily fulfilled by a judicious choice of catalyst and conditions.

The preferred temperature ranges under these conditions are:

Stage 1 _____ 100 to 250° C., inlet.
Stage 2 _____ 150 to 250° C., inlet.
Outlet temperature below 350° C.

B. To the gas to be treated, both hydrogen and ammonia are added. The mixture is passed into a single stage catalyst bed containing a single variety of catalyst particles. Since reduction of nitrogen dioxide to nitric oxide occurs at very high space velocities, nitrogen dioxide is converted to nitric oxide with such speed that the deleterious $NH_3$—$NO_2$ combination is minimized in concentration and effect. The ammonia selective reaction follows the conversion by hydrogen of nitrogen dioxide to nitric oxide. The effluent is low in both nitric oxide and nitrogen dioxide. The preferred inlet temperature is 100 to 300° C. and the preferred outlet temperature is below 350° C.

C. As in process B above, both hydrogen and ammonia are added to the gas stream. The mixture is passed into a single bed containing two distinct layers of catalyst. The upstream layer consists of catalyst which is highly selective for the first reaction, i.e. the reaction with hydrogen, but has little or no activity in the ammonia selective reaction; an example of such a catalyst is ruthenium. The downstream, but contiguous, layer is a catalyst effective in the ammonia selective reaction and, for this layer, platinum is preferred. Ruthenium, while being relatively poor for the ammonia selective step, is not bleached by the combination of ammonia and nitrogen dioxide, and in this arrangement, therefore, both catalysts have extremely long life. The preferred inlet temperature is about 170° C. and the outlet temperature, below 350° C.

Among the fuels which may be employed in the process of the invention are hydrogen, carbon monoxide, acetylene, ethylene, and other pure and mixed streams having a low ignition temperature. The quantity of hydrogen may range from the nitrogen dioxide equivalent to thirty times the nitrogen dioxide equivalent, with the lower end of this range being preferred for economic reasons. Regardless of the hydrogen-nitrogen dioxide ratio, the hydrogen is always present in a quantity far less than the oxygen equivalent. In the second stage, ammonia is employed in the range of from one to five times the nitric oxide equivalent.

In single bed systems, hydrogen and ammonia are used simultaneously, and hydrogen may be present in a range from the nitrogen dioxide equivalent to five times this value, while the ammonia may be in the range of from one to four times the nitric oxide equivalent.

The process operates in the absence of any catalyst, but catalysts are effective in lowering the temperature and hydrogen requirement. Many substances have some catalytic activity and plain activated alumina, for example, shows some enhancement of reaction rate over that observed in the absence of a catalyst. Of particular interest, however, are the platinum group metals, either per se or supported on suitable carriers, and of these the preferred catalytic metals are platinum, ruthenium and palladium. These metals may be supported on carriers such as activated alumina, silica gel, diatomaceous earth and other similar metal catalyst supports. The catalyst metal may be in the range of about 0.05 to about 5 percent by weight of the catalyst metal and support, and the support may be in the form of pellets, granules or powder. The supported catalyst may be prepared in any suitable manner, i.e. by treating the carrier or support with a solution of a suitable metal compound, and then reducing the metal compound to metal.

The space velocity employed in the process of the present invention may be in the range of 10,000 to 120,000 standard cubic feet of gas per hour per cubic foot of catalyst. The general effect of increasing the space velocity is to improve the selectivity of the process.

The temperature range which may be employed is about 100 to 500° C., and for each catalyst there is a temperature zone above and below which nitrogen dioxide removal is poor. When the nitrogen dioxide removal is used as a pretreatment for the ammonia selective step, conditions are chosen so that the gas enters the ammonia selective step at a temperature typically between 150 and 250° C.

The pressure may be in the range of atmospheric to about 100 p.s.i.g. or more. For any given set of conditions, improved results are obtained with an increase in pressure.

The gas streams amenable to treatment by the process of the invention may contain nitric oxide, nitrogen dioxide, oxygen, and inert gases, such as nitrogen, argon, helium and neon. The gases may be dried or saturated with water vapor; the nitrogen dioxide content may be in the range of 0.1 to 5 percent by volume, but the invention is particularly applicable to streams containing 0.1 to 0.5 percent by volume nitrogen dioxide. Because of the decrease in selectivity with increase in temperature, under any given set of conditions, removal of large quantities of nitrogen dioxide, such as 1 percent or more by volume, may be accomplished by a multi-stage system. For example, a portion of the nitrogen dioxide would be removed by hydrogen addition and passage of the gas over a platinum catalyst at a temperature of 100 to 200° C. More hydrogen would then be added and the gas mixture passed over a palladium catalyst in the temperature range of 200 to 300° C., with each stage thereby operating in a temperature zone of maximum selectivity. The oxygen content of the streams may be from 0 to 22 percent by volume, but in nitric acid waste gases, the range of primary interest is 3 to 5 percent by volume.

The invention will be further illustrated by reference to the following specific examples, in which all gaseous percentages are by volume:

Example I

This example is an illustration of combination process B described above. The gas stream treated was essentially nitrogen, containing 3 percent oxygen; 0.3 percent nitric oxide was introduced, and appreciable conversion to nitrogen dioxide occurred ahead of the catalyst. Both ammonia vapor and hydrogen were metered into the stream to effect simultaneous nitrogen dioxide and nitric oxide removal. The catalyst employed was 0.5 percent platinum on activated alumina, the pressure was 100 p.s.i.g., and the space velocity was 60,000 s.c.f.h./c.f.

The effluent gas was analyzed photometrically for nitrogen doxide, and chemically for combined nitrogen dioxide and nitric oxide. Effective removal of both gases was found under several conditions, as follows:

| Percent $H_2$ Added | Percent $NH_3$ Added | Temps., Inlet | ° C. Bed | $NO_2$ upstream, percent | $NO_2$ downstream, percent | Combined NO and $NO_2$ downstream, percent |
|---|---|---|---|---|---|---|
| 0.3 | 0 | 122 | 154 | 0.17 | 0.05 | |
| 0.58 | 0 | 123 | 175 | 0.17 | 0.03 | |
| 0.58 | 0.19 | 124 | 200 | 0.10 | 0.02 | 0.060 |
| 0.58 | 0.30 | 124 | 201 | 0.09 | 0.01–0.02 | 0.039 |
| 0.6 | 0.39 | 129 | 201 | 0.09 | 0.02 | 0.050 |

After this experiment, the appearance of the catalyst was essentially unchanged, in contrast to the bleaching usually induced during selective ammonia processing using platinum catalyst.

Example II

A stainless steel reactor containing two catalyst beds was used, and a simulated nitric acid plant tail gas was passed downwardly through this multi-bed arrangement. The top, or upstream, bed consisted of 7.5 grams of 0.5 percent platinum on activated alumina, and the lower, or downstream, bed consisted of 22.5 grams of the same type of catalyst. The gas pressure was maintained at 90 p.s.i.g. in the reactor, and the flow rate corresponded to a space velocity of 67,000 s.c.f.h./c.f. in the top bed and 27,000 s.c.f.h./c.f. in the lower bed To the waste gas containing oxygen, nitric oxide, nitrogen and nitrogen dioxide, hydrogen was added in a metered quantity just ahead of the top or upstream bed; ammonia gas was metered and added between the two beds. The overall gas composition as metered was:

| | |
|---|---|
| $O_2$ | 3.0%. |
| NO | 0.4%. |
| $N_2$ | 95. |
| $H_2$ | 0.8 (added before first bed). |
| $NH_3$ | 0.4 (added before second bed). |

Photometer readings indicated that most of the nitric oxide reacted to form nitrogen dioxide before the gas reached the top catalyst.

The temperatures of the two beds were then adjusted to give optimum removal of nitrogen oxides, as well as ammonia. Removal of ammonia is desirable in order to obviate the formation of salts downstream of the catalyst. A life test of the two-bed system at optimum temperatures indicated good nitrogen oxides removal and ammonia removal, without deterioration, for a period of 360 hours:

| Running Time, hrs. | First Bed | | Second Bed | | | |
|---|---|---|---|---|---|---|
| | Temp., °C. | Percent $NO_2$ out | Temp., °C. | Percent $NO_2$ out | Percent NO out | Percent $NH_3$ |
| 23 | 204 | 0.05 | 222 | 0.00 | 0.012 | <0.0001 |
| 100 | 200 | 0.04 | 225 | 0.00 | 0.027 | 0.09 |
| 145 | 234 | 0.03 | 291 | 0.00 | 0.027 | <0.0001 |
| 193 | 225 | 0.03 | 282 | 0.00 | 0.06 | <0.0001 |
| 268 | 234 | 0.02 | 291 | 0.00 | 0.021 | <0.0001 |
| 316 | 237 | 0.025 | 291 | 0.00 | 0.029 | <0.0001 |
| 360 | 239 | 0.01 | 287 | 0.00 | 0.008 | <0.0001 |

In a comparative experiment in which the first bed and hydrogen were eliminated, effluent nitrogen dioxide was 0.13–0.18 percent, as measured photometrically over a period of 27 to 264 hours, at temperatures in the range of 273–292° C. Chemical analysis indicated 0.17 percent nitrogen dioxide. When lower temperatures were used, nitrogen oxides removal was good, but there was severe plugging of the apparatus due to salt formation.

Thus, the hydrogen pretreatment step prevented salt formation and permitted good nitrogen oxides removals under a single set of conditions.

It will be obvious to those skilled in the art that many modifications may be made within the scope of the present invention without departing from the spirit thereof, and the invention includes all such modifications.

What is claimed is:

1. A process for the selective removal of oxides of nitrogen from oxygen-containing gases also containing nitrogen doxide, nitric oxide and inert gases, which comprises contacting an admixture of the oxygen-containing gases and a gaseous fuel selected from the group consisting of hydrogen, carbon monoxide and gaseous hydrocarbons, the fuel being present in the admixture in amount less than the oxygen equivalent, with a platinum group metal catalyst at an elevated temperature thereby selectively reducing the nitrogen dioxide to nitric oxide by reaction with the fuel, and contacting the thus-obtained gaseous mixture together with ammonia with a platinum group metal catalyst at an elevated temperature thereby selectively reducing the nitric oxide by reaction with the ammonia, to obtain an effluent gas substantially free of air-polluting nitrogen oxides.

2. A process in accordance with claim 1 in which the contacting of the admixture of said oxygen-containing gases and the gaseous fuel with the platinum group metal catalyst is effected at a temperature from about 100° C. to 500° C., and the contacting of the thus-obtained gaseous mixture together with the ammonia with the platinum group metal catalyst is effected at a temperature from about 100° C. to 500° C.

3. A process according to claim 1 in which the catalyst is selected from the group consisting of platinum, ruthenium, and palladium.

4. A process according to claim 1 in which the catalyst is a single catalyst in a single catalyst bed.

5. A process according to claim 1 in which the catalyst is a single catalyst in a plurality of catalyst beds.

6. A process according to claim 1 in which the catalyst is a plurality of catalysts in a single bed.

7. A process according to claim 1 in which the catalyst is a plurality of catalysts in a plurality of beds.

8. A process according to claim 4 in which the catalyst is platinum.

9. A process according to claim 5 in which the catalyst is platinum.

10. A catalyst according to claim 6 in which the catalyst is in a plurality of layers, the upstream layer comprising ruthenium and the downstream layer comprising platinum.

11. A process according to claim 7 in which the upstream catalyst bed comprises ruthenium and the downstream catalyst bed comprises platinum.

12. A process according to claim 8 in which the fuel is hydrogen.

13. A process according to claim 9 in which the fuel is hydrogen.

14. A process according to claim 10 in which the fuel is hydrogen.

15. A process according to claim 11 in which the fuel is hydrogen.

16. A process for the selective removal of oxides of nitrogen from oxygen-containing gases also containing nitrogen dioxide, nitric oxide and inert gases, which comprises adding a gaseous fuel selected from the group consisting of hydrogen, carbon monoxide and gaseous hydrocarbons to said oxygen-containing gases, the fuel being present in the resulting admixture in amount less than the oxgyen equivalent, passing the thus-obtained gaseous mixture into contact with a platinum group metal catalyst in a first reaction stage at an elevated temperature thereby selectively reducing the nitrogen dioxide to nitric oxide by reaction with the fuel, adding ammonia to the gaseous effluent from the first stage, and passing the thus-obtained gaseous mixture into contact with a platinum group metal catalyst in a second reaction stage thereby selectively reducing the nitric oxide by reaction with the ammonia to obtain an effluent gas substantially free of air-polluting nitrogen oxides.

References Cited in the file of this patent

UNITED STATES PATENTS

| 2,382,189 | Wahl | Aug. 14, 1945 |
| 2,910,343 | Childers et al. | Oct. 27, 1959 |

OTHER REFERENCES

Altiere: "Gas Analysis and Testing of Gaseous Materials," publ. by the American Gas Association, Inc., N.Y., 1945, pages 30, 31.

Michailova: "The Kinetics of the Reaction Between Ammonia and Nitric Oxide in the Surface of a Platinum Filiament," Acta Physicochimica U.R.S.S. Published by the Academy of Sciences of the U.S.S.R., Moscow, vol. 10, No. 5, 1939, pages 653–676.